US012605948B2

(12) United States Patent
Campanini

(10) Patent No.: US 12,605,948 B2
(45) Date of Patent: Apr. 21, 2026

(54) PRINTER AND PRINTING METHOD FOR TICKETS

(71) Applicant: Custom S.p.A., Fontevivo (IT)

(72) Inventor: Alberto Campanini, Fidenza (IT)

(73) Assignee: Custom S.p.A., Fontevivo (IT)

( * ) Notice: Subject to any disclaimer, the term of this patent is extended or adjusted under 35 U.S.C. 154(b) by 2 days.

(21) Appl. No.: 18/834,658

(22) PCT Filed: Feb. 1, 2023

(86) PCT No.: PCT/IB2023/050883

§ 371 (c)(1),
(2) Date: Jul. 31, 2024

(87) PCT Pub. No.: WO2023/152606

PCT Pub. Date: Aug. 17, 2023

(65) Prior Publication Data

US 2025/0153492 A1 May 15, 2025

(30) Foreign Application Priority Data

Feb. 10, 2022 (IT) ........................ 102022000002432

(51) Int. Cl.
*B41J 11/66* (2006.01)
*B41J 13/00* (2006.01)
*G07B 1/00* (2006.01)

(52) U.S. Cl.
CPC ......... *B41J 11/663* (2013.01); *B41J 13/0036* (2013.01); *G07B 1/00* (2013.01)

(58) Field of Classification Search
CPC .. B41J 11/663; B41J 13/0036; B41J 13/0009; G07B 1/00
See application file for complete search history.

(56) References Cited

U.S. PATENT DOCUMENTS

2004/0165928 A1* 8/2004 Harris .................... B41J 11/006 400/635
2014/0034718 A1* 2/2014 Campanini ............. G07F 17/42 235/3
2015/0145915 A1* 5/2015 Thomas ............... B41J 13/0009 347/16

FOREIGN PATENT DOCUMENTS

CN 109389688 A 2/2019
IT O20110033 A1 8/2012
JP H1074273 A * 3/1998

(Continued)

OTHER PUBLICATIONS

PCT International Search Report and Written Opinion of the International Searching Authority; Application No. PCT/IB2023/050883; Completed: Apr. 13, 2023; Mailing Date: Apr. 21, 2023; 11 Pages.

*Primary Examiner* — Christle I Marshall
(74) *Attorney, Agent, or Firm* — Whitmyer IP Group LLC

(57) ABSTRACT

A ticket printer is disclosed including a box-like support configured for selective mounting in a first configuration, in which the box-like support has a first outlet facing a reception area in which a user can receive a ticket exiting from the first outlet, or in a second configuration, in which the box-like support has a second outlet facing the reception area in which a user can receive a ticket which exits from the second outlet and presents the first outlet facing a collection area to which the ticket can be sent if, after a pre-set time, a user has not collected the ticket from the second outlet.

11 Claims, 11 Drawing Sheets

(56) References Cited

FOREIGN PATENT DOCUMENTS

| | | | | |
|---|---|---|---|---|
| JP | 2005035733 | A | * | 2/2005 |
| WO | 2012110981 | A2 | | 8/2012 |

* cited by examiner

PRINTER AND PRINTING METHOD FOR TICKETS

BACKGROUND OF THE INVENTION

The invention relates to a printer and a printing method for tickets, in particular for allowing a user to receive a document (ticket, receipt, coupon, etc.) which is printed on a print support (for example a strip of paper unwound from a reel) and delivered to the user in real time.

Specifically, but not exclusively, the invention may be employed in an automatic kiosk or dispenser of tickets, receipts, and coupons for a user, where the kiosk or dispenser may be located, for example, in bank tellers or ATMs, payment terminals for parking or public transport, self-checkouts for paying for goods and/or services, petrol stations, service stations, gaming stations, vending machines in general, etc.

The invention refers, in particular, to a printer made in accordance with the preamble of claim 1. Such a printer is already known, for example from the patent publication WO 2012/110981 A2.

SUMMARY OF THE INVENTION

An object of the invention is to provide a ticket printer and a printing method which are alternative to those of the prior art.

An object of the invention is to provide a ticket printer and a printing method having a high versatility with the possibility of performing different functions according to the need and/or the situation.

An advantage is to make available a printer and a printing method that are flexible in use and that allow a printed document to be distributed in real time in a reliable and efficient way.

An advantage is that tickets can be dispensed to users in various ways according to the specific operating requirements.

An advantage is to provide a compact and constructively simple and economical ticket printer.

These objects and advantages, and still others, are achieved by the printer and by the method according to one or more of the claims set forth below.

In one embodiment, a ticket printer is configured for being selectively mounted in a first configuration, in which the printer has a first outlet facing a reception area in which a user can receive a ticket exiting from the first outlet, or in a second configuration, in which the printer has a second outlet facing the reception area in which a user can receive a ticket that comes out of the second outlet while presenting the first outlet facing a collection area to which the ticket can be sent if, after a pre-set time, a user has not collected the ticket coming out of the second outlet.

BRIEF DESCRIPTION OF THE DRAWINGS

The invention can be better understood and implemented with reference to the attached drawings which illustrate a non-limiting example of implementation, in which.

DETAILED DESCRIPTION

Figure 1:
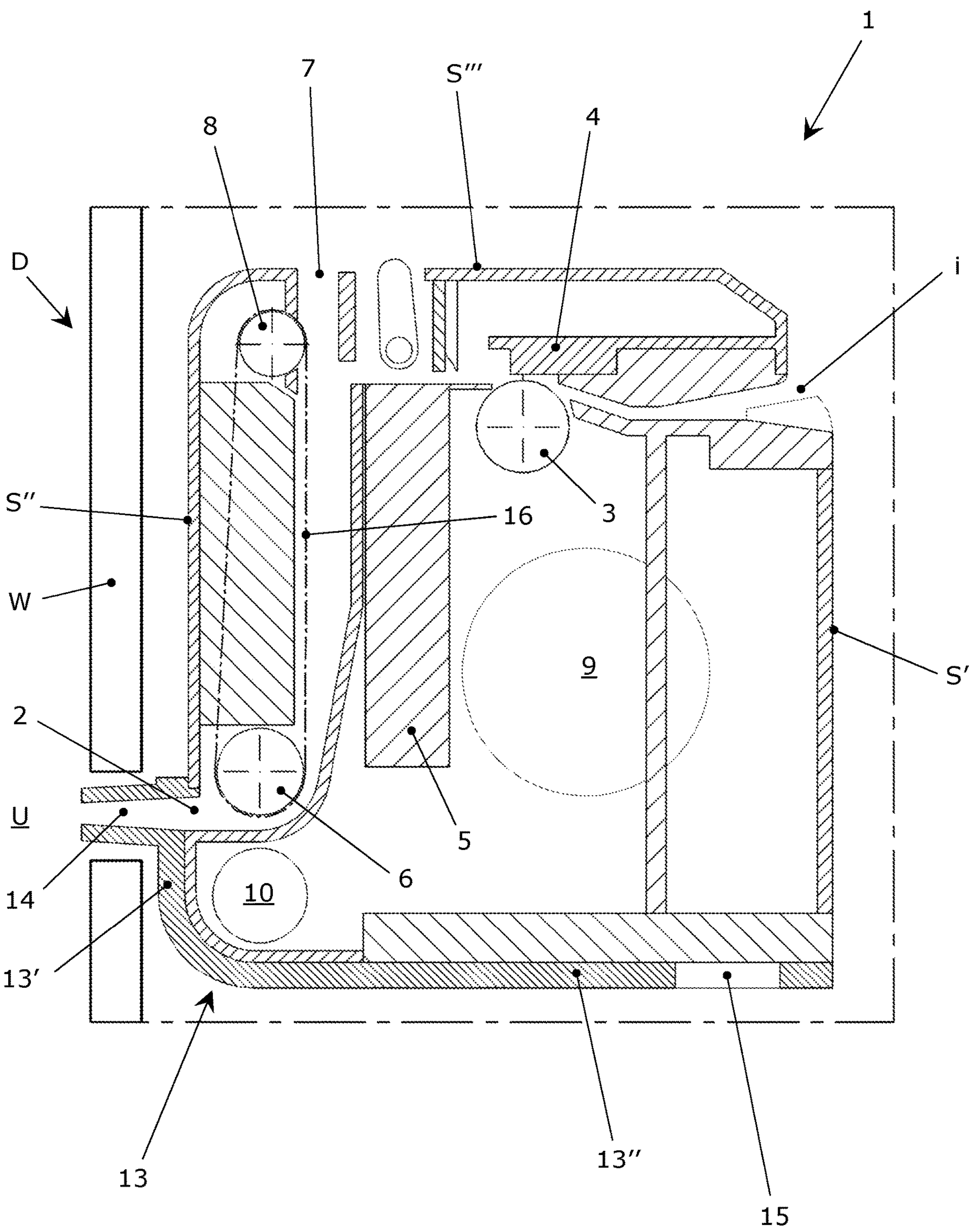
FIG. 1 shows a section, in vertical elevation, of an example of a printer made according to the invention, selectively mounted to operate in a first configuration.
Figure 2:
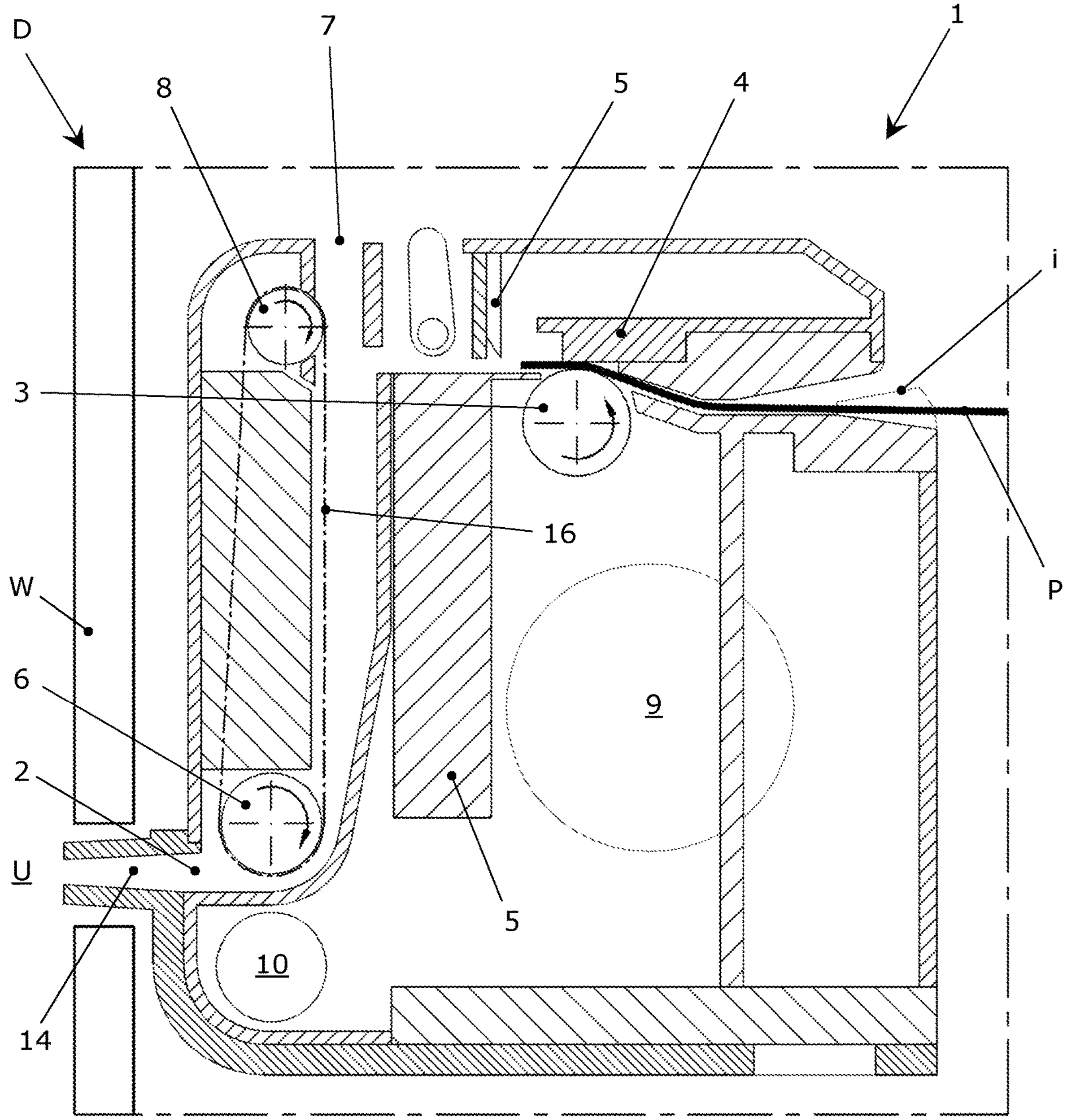
FIGS. 2 to 5 show the printer of FIG. 1 mounted in the first configuration in four phases of operation in sequence.
Figure 3:
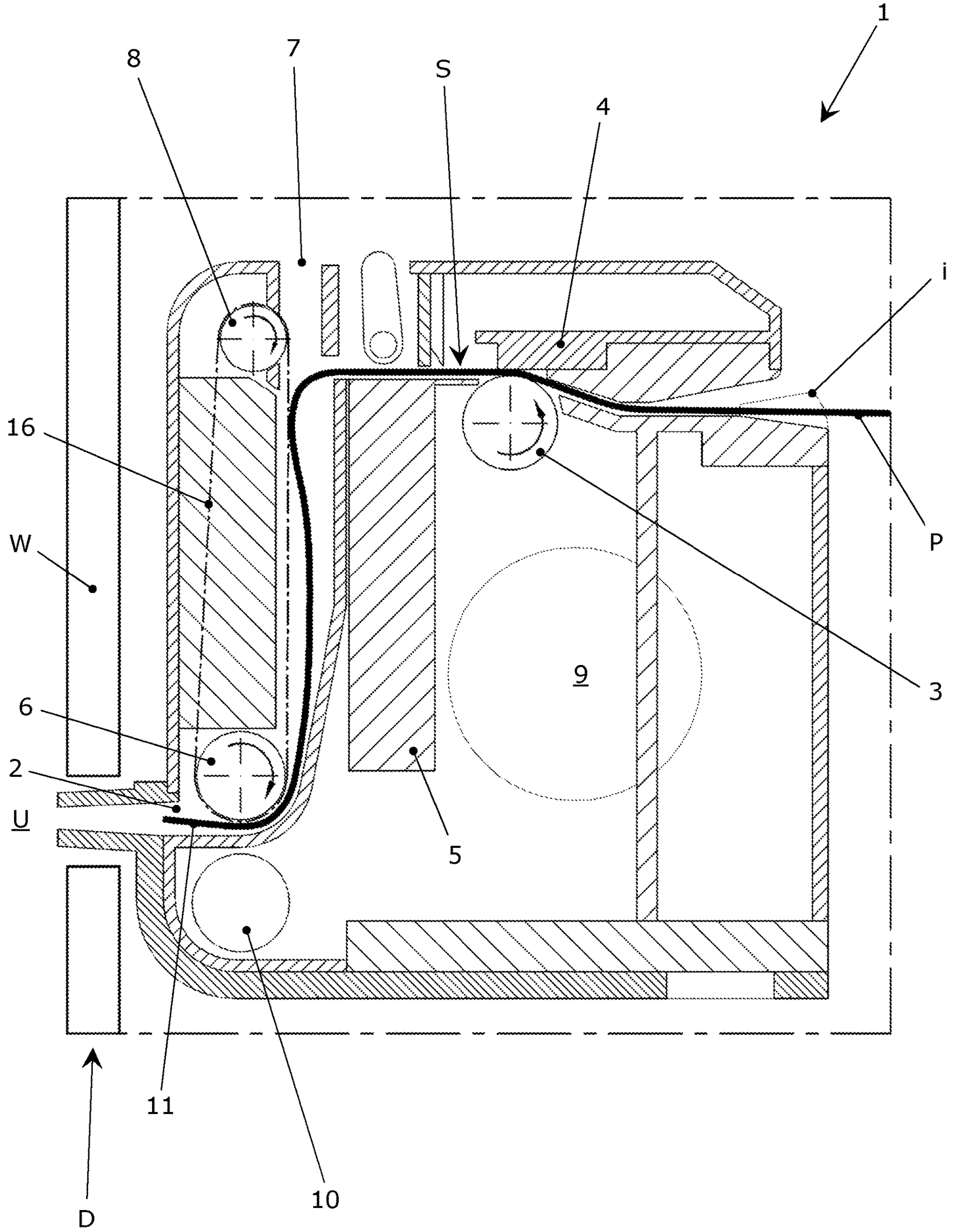

With reference to the aforementioned figures, reference numeral 1 indicates as a whole a ticket printer, which can print a document, for example a ticket, receipt or voucher, and can deliver the printed document to a user in real time. Printer 1 may print the document on a print support P.

The printer 1 comprises a support, for example a box-like support. The (box-like) support comprises a first outlet 2 for the print support P and a second outlet 7 for the print support P. The box support may furthermore comprise an inlet i for receiving the print support P.

The inlet i for the print support P may be arranged, in particular, on an inlet face S' of the box-like support. The first outlet 2 may be arranged, in particular, on a first outlet face S" of the box-like support. The second outlet 7 may be arranged, in particular, on a second outlet face S'" of the box-like support. In particular, the first outlet face S" of the box-like support is opposite the inlet face S'. The second outlet face S'" may be, in particular, adjacent to the inlet face S' and to the first outlet face S".

The print support P may comprise, for example, a strip of thermal paper, or other printable material, in particular a print support P unwound from a reel. Other print supports may be provided. It is possible to use, for example, a plurality of sheets of paper, or a strip of accordion-folded sheets, etc. The printer 1 may comprise, in particular, a print support magazine (not shown, for example of a known type) arranged outside the box-like support, as provided according to the present embodiment. The print support magazine may comprise, for example, a print support roll (paper roll).

The printer 1 comprises a printing device arranged in the box-like support for printing the document on the print support P. This printing device may comprise, in particular, a printing head 4 and a printing roller 3 cooperating with each other, for example, opposed to each other. The printing head 4 may be of a known type, for example a thermal printing head. The printing roller 3 may feed the print support P towards the first outlet 2. The printing head 4 and the printing roller 3 may be arranged facing each other from opposite sides of a path section of the print support P between the inlet i and the first outlet 2 and/or the second outlet 7.

The printer 1 may comprise, in particular, a cutting device 5 arranged in the box-like support and configured to cut the print support P and form a ticket B with the print support P. The cutting device 5 may be provided in particular, of an actuator (for example of known type) for actuating a cutting blade. The cutting device 5 may be, for example, of the guillotine type. The cutting device 5 may be arranged after the printing head 4 and/or after the printing roller 3, where "after" is to be understood with reference to the direction of advancement of the print support P towards the first outlet 2.

The printer 1 may comprise, in particular, a feeding device which in turn may comprise, in particular, a first feeding roller 6 provided with a reversible rotary motion with the possibility of rotating in a first direction to feed the print support P towards the first outlet 2 and to rotate in a second direction, opposite to the first direction, to feed the print support P towards the second outlet 7. The feeding device may comprise, in particular, a second feeding roller 8 provided with a reversible rotary motion with the possibility of rotating in a first direction to feed the print support P towards the first outlet (in cooperation with the first feeding roller 6), and of rotating in a second direction, opposite to the first direction, to feed the print support P towards the second outlet 7 (in cooperation with the first feeding roller 6). The feeding device may be extended, in particular, along a portion of the path of the print support P included between the second outlet 7 and the first outlet 2. The second feeding roller 8 may be arranged at a distance from the first feeding roller 6, where this distance is to be considered extended along a section of the path of the print support P included between the second outlet 7 and the first outlet 2. The feeding device may comprise, in particular, feeding means 16 with a flexible member extending in length at least partly along a portion of the path of the print support P included between the second outlet 7 and the first outlet 2. The flexible member feeding means 16 may comprise, in particular, one or two or more flexible members that may be moved and coupled to the first feeding roller 6 and/or second feeding roller 8.

The first feeding roller 6 may, in particular, be arranged closer to the first outlet 2 than the second feeding roller 8. The second feeding roller 8 may, in particular, be arranged closer to the second outlet 7 than the first feeding roller 6.

In the box-like support, at least a part of a portion of the path of the print support P is included between the second outlet 7 and the first outlet 2. This part of the portion of the path may comprise, in particular, a duct for transporting the print support P. This part of the portion of the path may extend, in particular, along a transversal direction to at least one portion of the path of the print support P included between the inlet i and the cutting device 5. In particular, the part of the portion of the path of the print support P included between the second outlet 7 and the first outlet 2 may extend, as in the specific example, along a direction substantially parallel to the first outlet face S" of the box-like support and along a direction transversal to the second outlet face S'" of the box-like support. The portion of path of the print support P included between the inlet i and the cutting device 5 may extend, in particular, along a direction substantially parallel to the second outlet face S'" and transversal to the inlet face S' and to the first outlet face S".

The printer 1 may comprise, in particular, a printing motor 9 and a feeding motor 10, arranged for example in the box-like support. The printing motor 9 may be configured, in particular, to drive the printing roller 3. The feeding motor may be configured, in particular, to drive the feeding device. The feeding motor may be configured, in particular, to drive both the first feeding roller 6 and the second feeding roller 8 simultaneously, for example by means of a mechanical transmission (for example of the belt or gear type or mixed or still other type) which connects a rotor of the feeding motor 10 with the rotation axes of the first feeding roller 6 and/or of the second feeding roller 8. The printer 1 could comprise, in examples not shown, two feeding motors configured to operate one the first feeding roller 6 and the other the second feeding roller 8.

The box-like support may be configured for being mounted in a first configuration (FIG. 1) in which the first outlet 2 faces a reception area U in which a user can receive the ticket B coming out of the first outlet 2.

Figure 6:
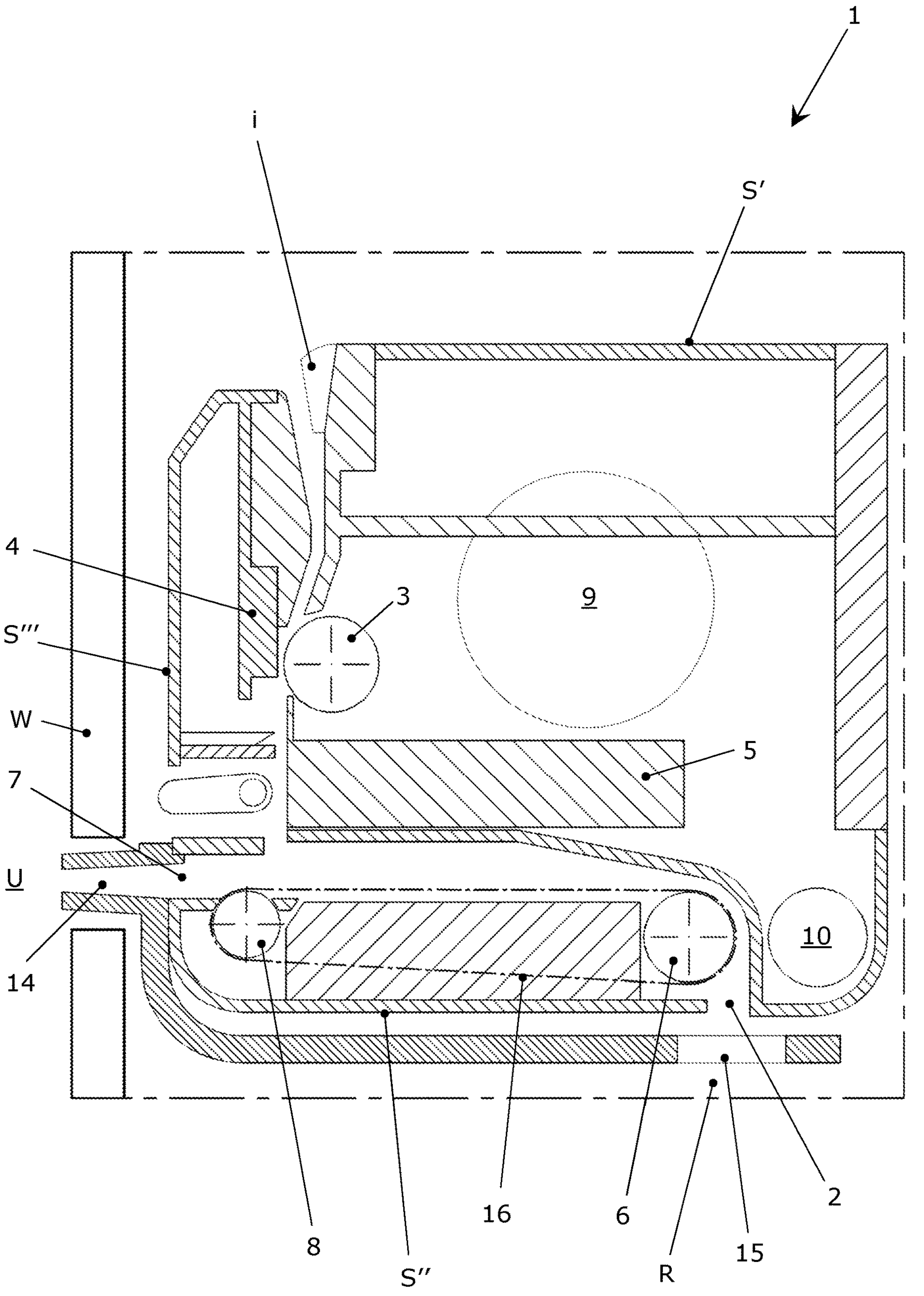
FIG. 6 shows a section, in vertical elevation, of the printer of FIG. 1, selectively mounted to operate in a second configuration.

The box-like support may be configured for being mounted in a second configuration (FIG. 6) in which the second outlet 7 faces a reception area U in which a user can receive the ticket B which exits from the second outlet 7. In this second configuration, the first outlet 2 may face a collection area R. In the second configuration, the ticket B may be dispensed through the second outlet 7 or removed from the first outlet 2.

The printer 1 may comprise, in particular, a support 13 configured to receive and support the box-like support both in the first and in the second configuration. The support 13 may be, in particular, mounted on a supporting structure of a kiosk D or distributing machine for dispensing tickets. The support 13 may comprise, in particular, a dispensing side 13' with at least one delivery outlet 14 and a support side with at least one collection outlet 15. The delivery outlet 14 may face, in particular, the first outlet 2 when the support 13 receives the box-like support in the first configuration and may face, in particular, the second outlet 7 when the support 13 receives the box-like support in the second configuration.

The collection outlet 15 may face the first outlet 2 when the support 13 receives the box-like support in the second configuration.

The delivery outlet 14 may face the reception area U both when the support 13 receives the box-like support in the first configuration, and when the support 13 receives the box-like support in the first configuration.

The box-like support may be mounted on the support 13 by means of removable connections, for example screws and bolts, pins, grooved profiles, snap fastening systems, etc.

With reference to FIGS. 2 to 5 and 7 to 11, D has been indicated as a kiosk or distributing machine for dispensing tickets. The kiosk D may comprise, in particular, a front wall W comprising an external side accessible to the user of the kiosk and an internal side opposite the external side. The kiosk D may also comprise the printer 1 arranged on the internal side.

The front wall W may comprise, in particular, a ticket exit opening which defines the reception area U on the outer side of the front wall W in which the user can receive the ticket B.

The printer 1 may be arranged on the inner side of the front wall W of the kiosk D and the box-like support may be selectively mounted in the first or second configuration. In the first configuration, the first outlet face S" of the box-like support may face, in particular, the inner side of the front wall W and the first outlet 2 may face the ticket exit opening. In the second configuration, the second outlet face S'" of the box-like support may face, in particular, the inner side of the front wall W and the second outlet 7 may face the ticket exit opening.

The kiosk D may also comprise a collection area R inside the kiosk D and configured to receive at least one ticket B not collected by the user when the printer operates in the second configuration. In this second configuration, the first outlet face S" of the box-like support may face the collection area R inside the kiosk D.

The printer 1 may comprise, in particular, a (electronic and programmable) control unit configured to control the various actuators of the printer (for example, the printing head 4, the actuator of the cutting device 5, the printing motor 9, the feeding motor 10) and to carry out a first operating mode, when the box-like support is mounted in the first configuration. This control unit may also be configured to perform a second operating mode, when the box-like support is mounted in the second configuration.

Figure 4:
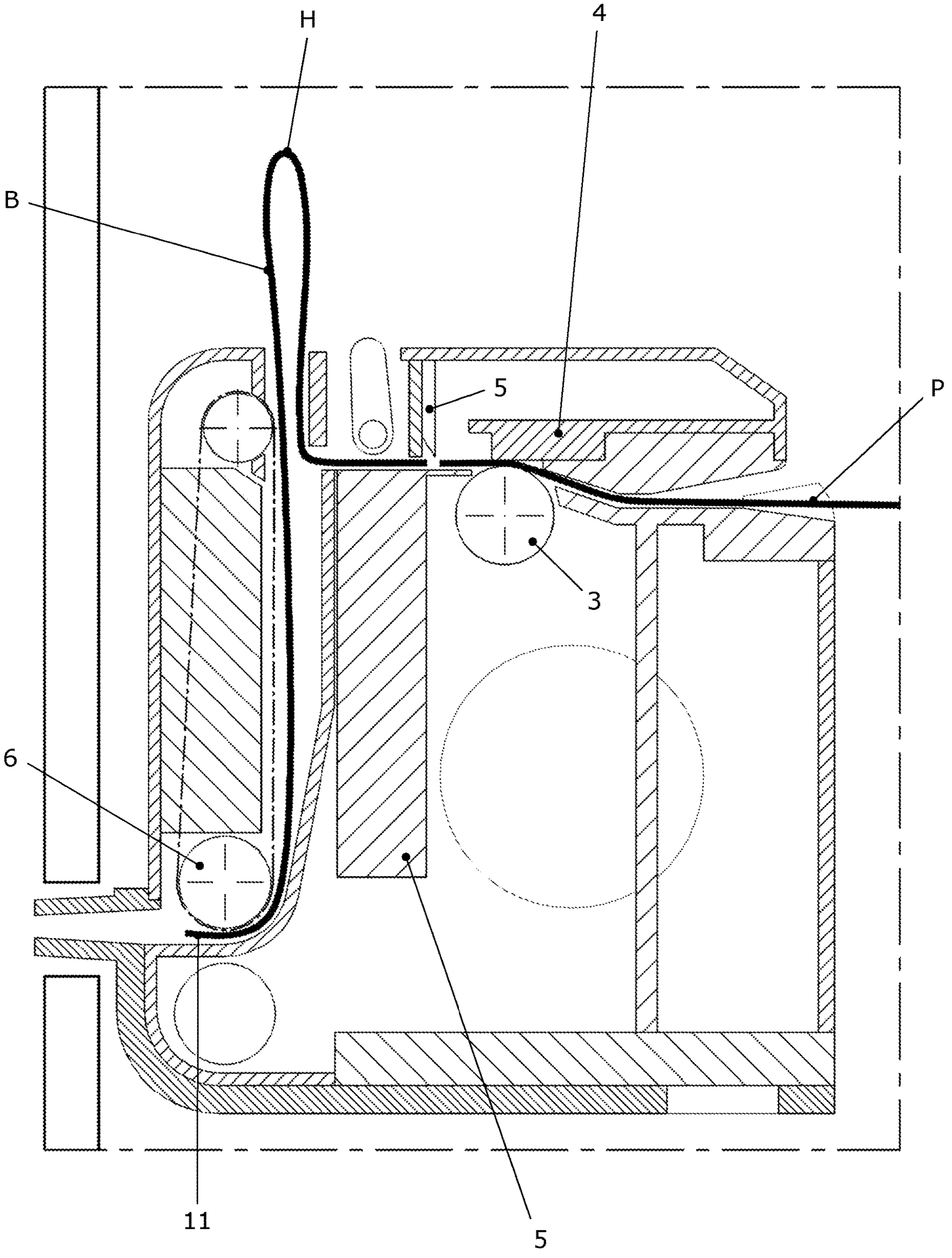
Figure 5:
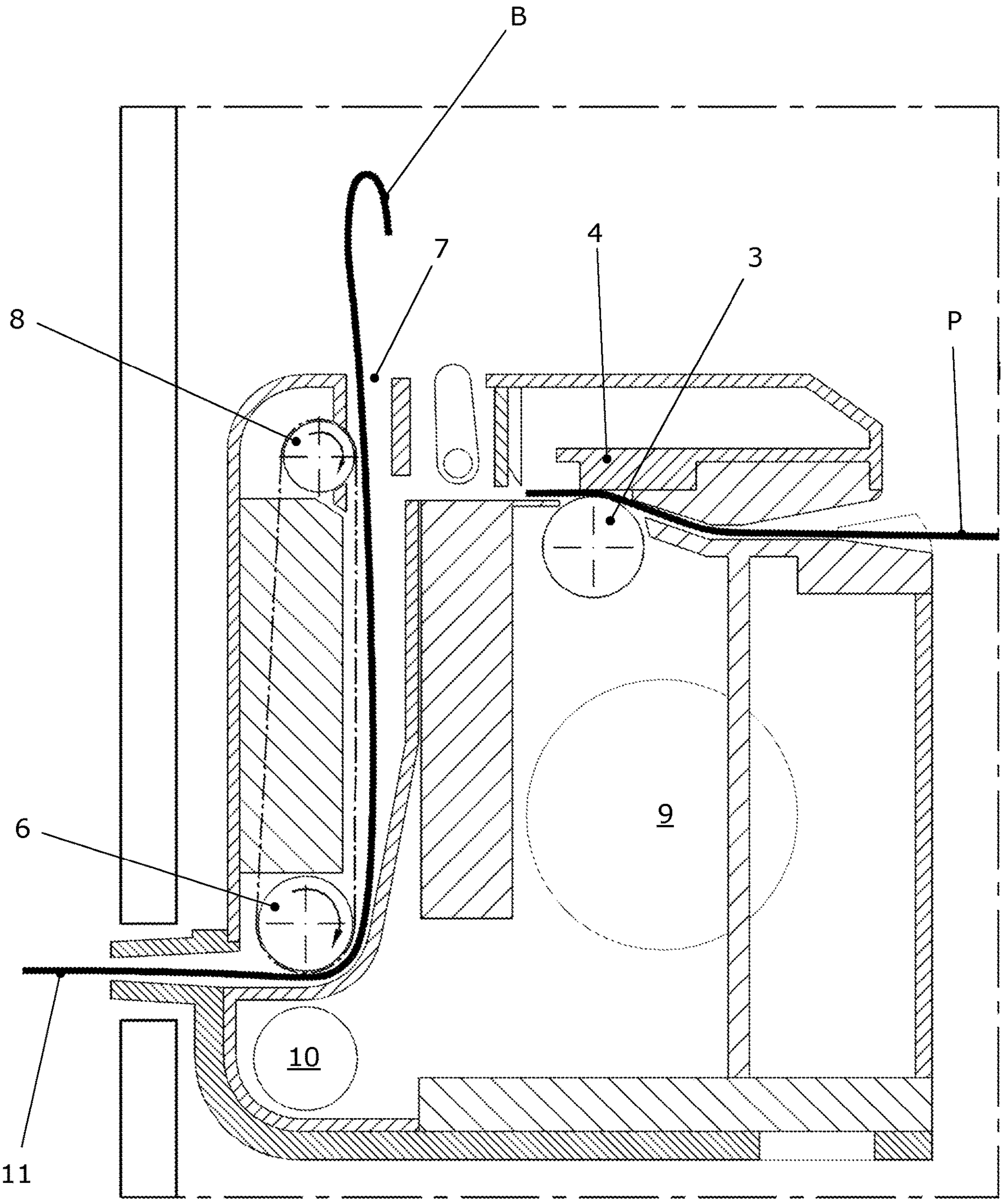

In the first operating mode of printer 1, the control unit may be configured to perform the following phases:

a) operating the printing roller 3 (FIG. 2) and rotating the feeding device in the first direction, in particular rotating the first feeding roller 6 in the first direction and rotating the second feeding roller 8 in the first direction, to feed the print support P to the first outlet 2;

b) after step a), stopping the feeding device, in particular stopping the first feeding roller 6 and the second feeding roller 8, when the print support P has engaged with the feeding device, in particular with the first feeding roller 6 (FIG. 3) and/or with the feeding means 16, and continuing to drive the printing roller 3, so that a first end 11 of the print support P is blocked by the feeding device, in particular by the first feeding roller 6 and/or by the feeding means 16, and that the print support P is moved by the printing roller 3 forming an accumulation loop H which emerges from the second outlet 7 (the accumulation loop H is visible in the following FIG. 4);

c) after step b), stopping the printing roller 3 and operating the cutting device 5 to cut the print support P and form the ticket B (FIG. 4);

d) after step c), rotating the feeding device (the first and second feeding rollers 6 and 8) in the first direction to dispense the ticket B through the first outlet 2 facing the reception area U (FIG. 5).

In the first operating mode of the printer 1, the accumulation loop H formed by the print support P which emerges from the second outlet 7 can be obtained thanks to the flexibility of the print support P.

In the first operating mode of the printer 1, thanks to the blocking of the first end 11 of the print support P and the formation of the accumulation loop H of the print support P, it is possible to avoid, for example when printing tickets are very long, that the print support P emerges from the first outlet 2 before the end of the printing of the document and/or before the end of the actuation of the cutting device 5 to form the ticket B, avoiding that the print support P can be damaged by an inattentive user, for example through an accidental tear, before phase c) above.

Figure 7:
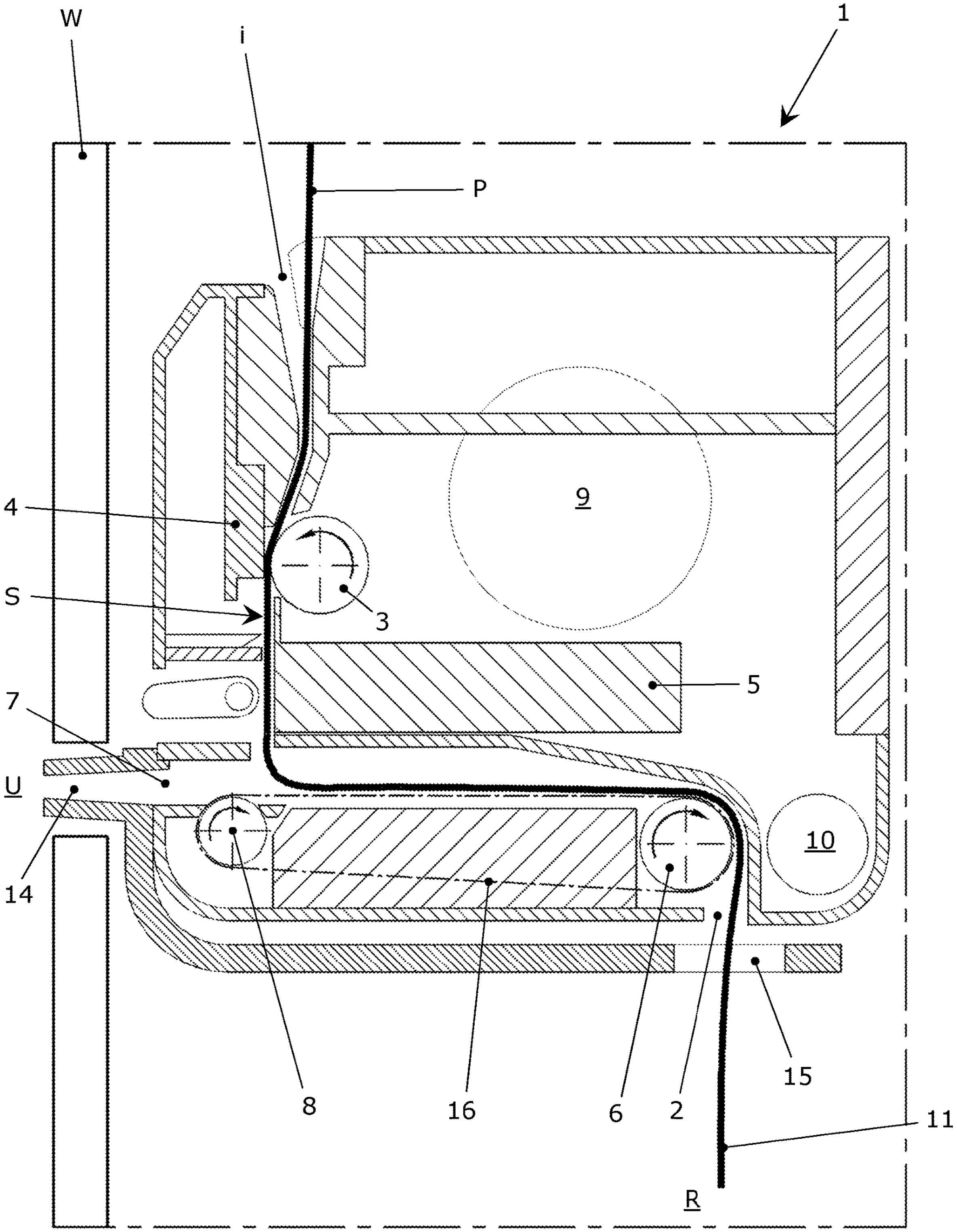
FIGS. 7 to 11 show the printer of FIG. 6 mounted in the second configuration in five phases of operation in sequence.
Figure 8:
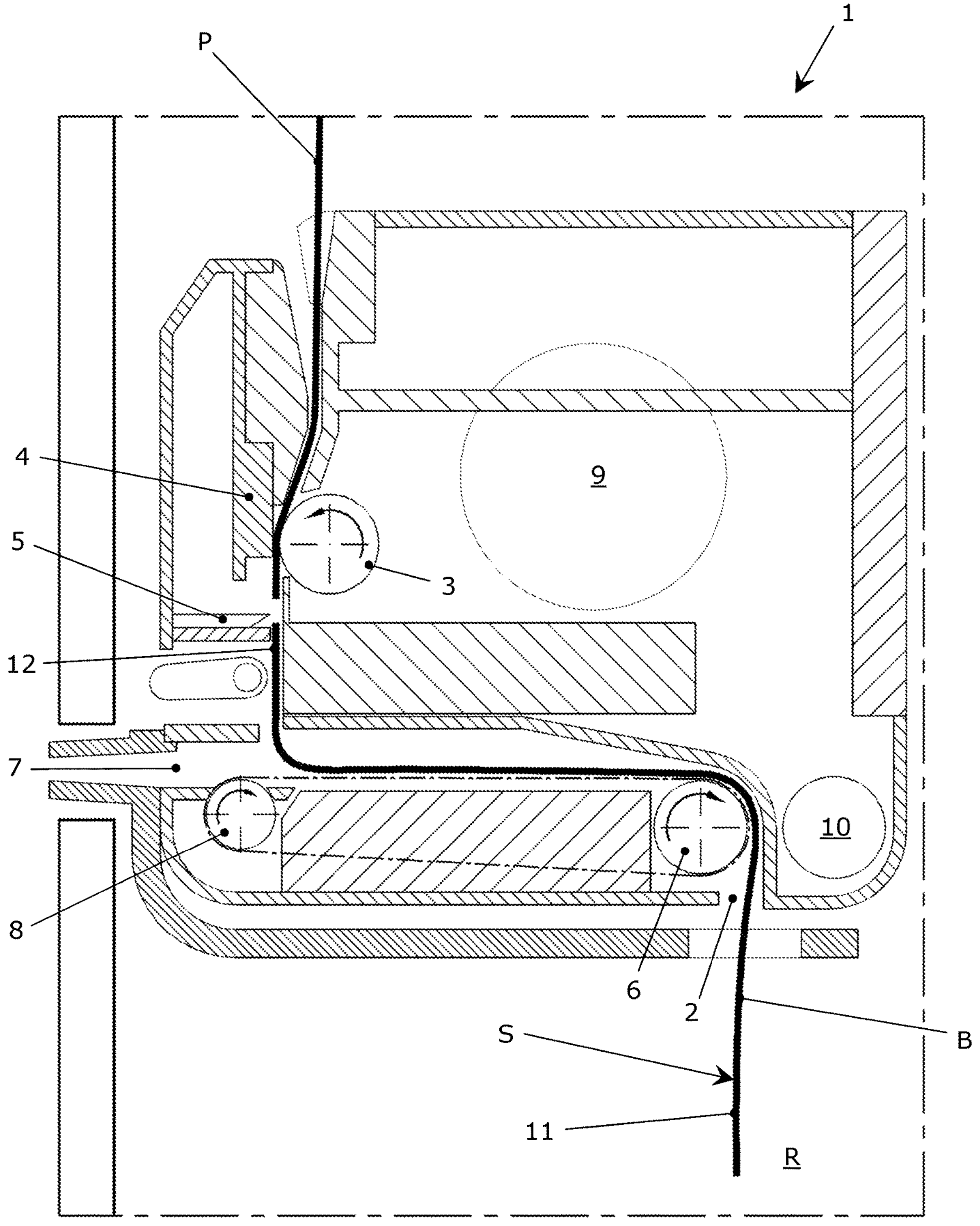
Figure 9:
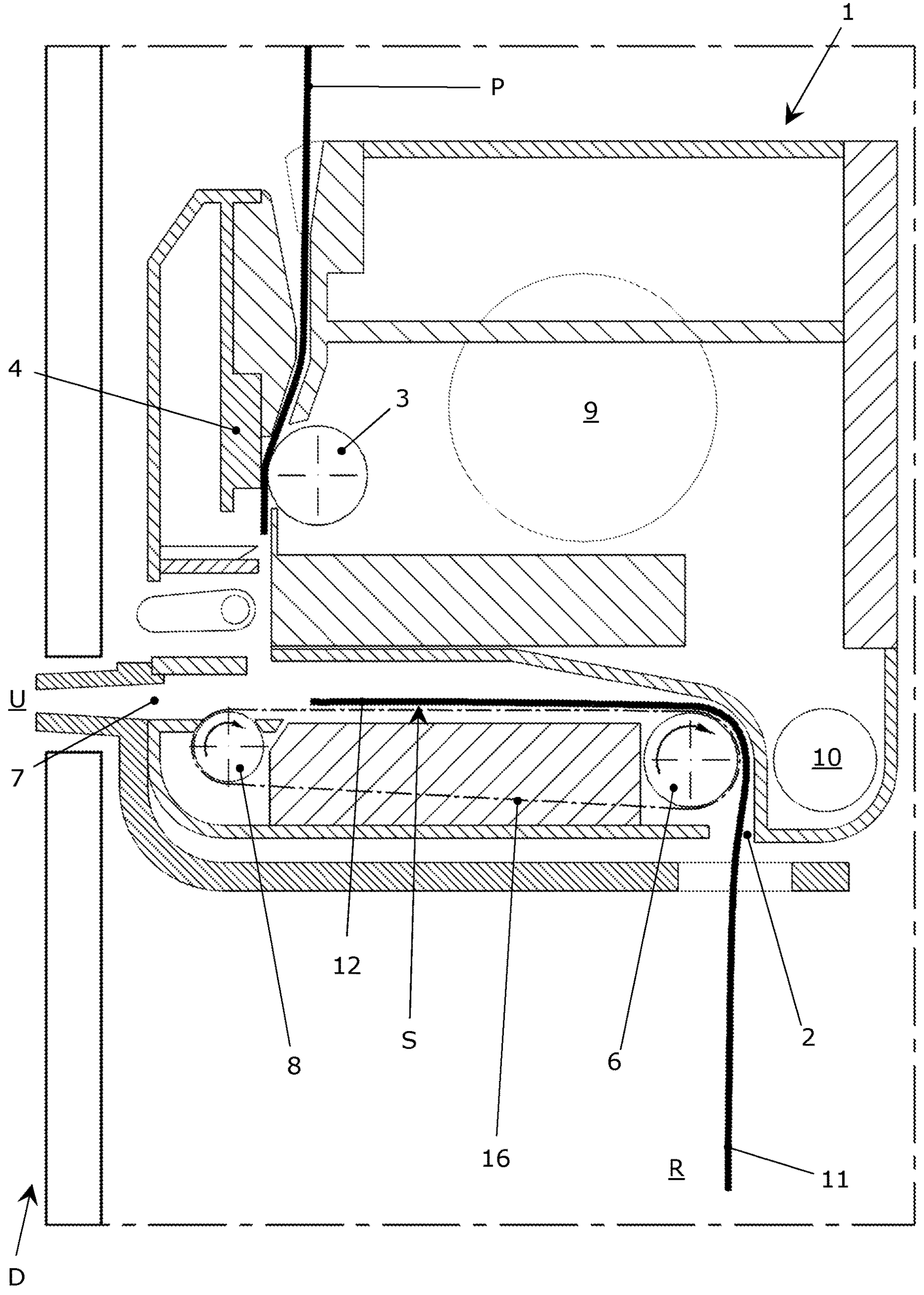
Figure 10:
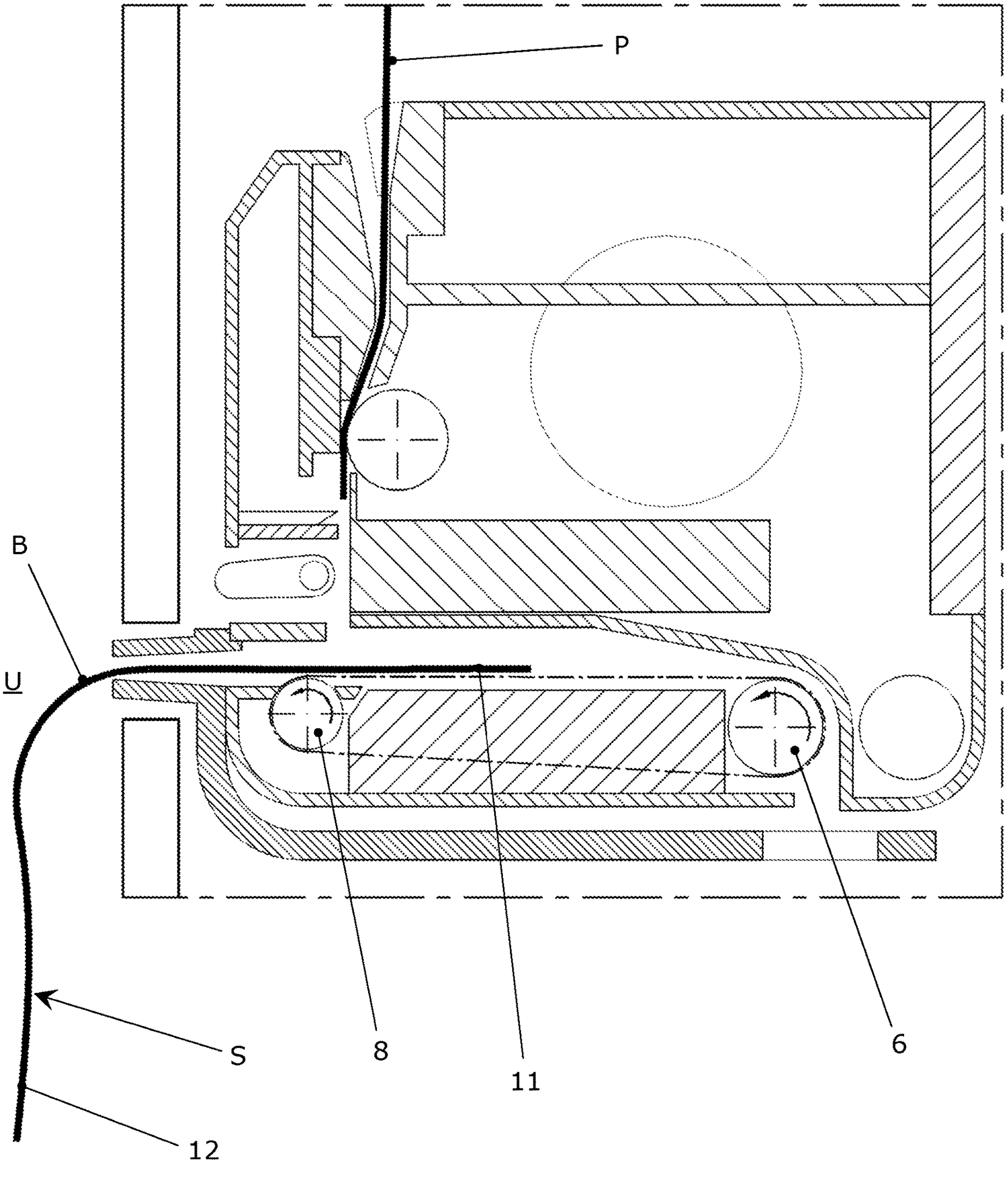
Figure 11:
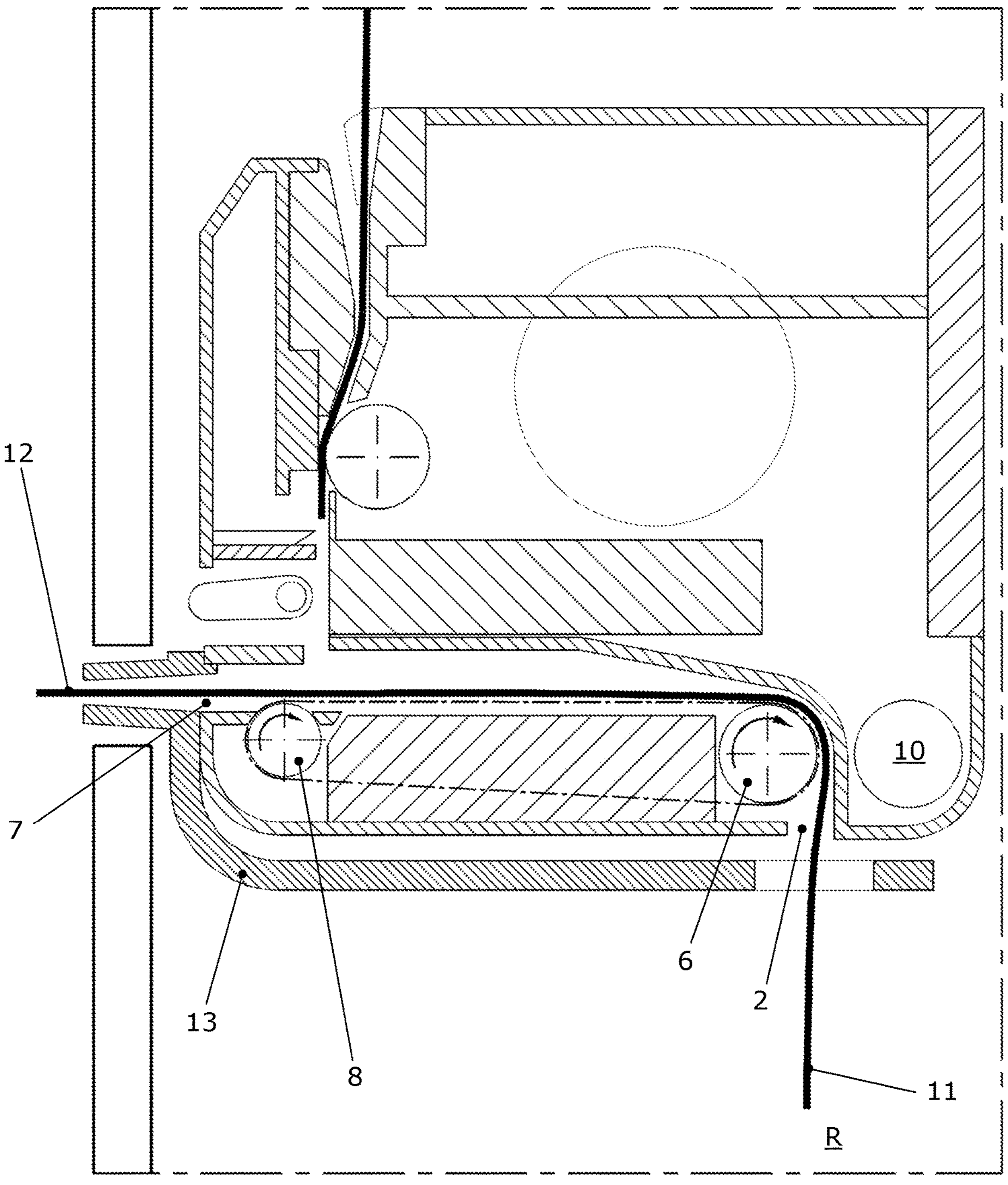

In the second operating mode of printer 1, the control unit may perform the following steps:

e) operating the printing roller 3, rotate the feeding device in the first direction, in particular rotating the first feeding roller 6 in the first direction and rotating the second feeding roller 8 in the first direction, to feed the print support P towards the first outlet 2 (FIG. 7);

f) after step e), stopping the printing roller 3 and the feeding device (the first and second feeding rollers 6 and 8);

g) after step f), operating the cutting device 5 to cut the print support P and form the ticket B which has the first end 11 distant from the cutting device 5 and a second end 12 close to the cutting device 5 (FIG. 8);

h) after step g), rotating the feeding device (the first feeding roller 6 and the second feeding roller 8) in the first direction of rotation to feed the ticket B towards the first outlet 2 until the second end 12 of the ticket B is arranged in the portion of path of the print support P included between the first outlet 2 and the second outlet 7, in particular between the first feeding roller 6 and the second feeding roller 8 (FIG. 9);

i) after step h), rotating the feeding device (in particular the first and second feeding rollers 6 and 8) in the second direction of rotation to dispense the ticket B towards the second outlet 7 facing the reception area U;

j) after step i), stopping the feeding device (the first feeding roller 6 and the second feeding roller 8) when the second end 12 of the ticket B has passed through the second outlet 7 to expose at least a portion of the ticket B to the user, at least another portion of the ticket B being arranged in the portion of the path of the print support P included between the first feeding roller 6 and the second feeding roller 8 (FIG. 10);

k) after step j), rotating the feeding device (the first feeding roller 6 and the second feeding roller 8) in the first direction of rotation if ticket B is not withdrawn by the user within a pre-set time, to retract ticket B and withdrawing ticket B towards the first outlet 2 which faces a collection area R for uncollected tickets (FIG. 11).

The control unit may be configured to perform, both in the first operating mode and in the second operating mode, the step of activating the printing head 4 in a suitable manner to print the print support P. The device printing may be configured, in particular, so that the printing head 4 prints on a given side S of the print support P so that, in step j) described above, the portion of the ticket exposed to the user has side S facing so as to be hidden from the user's view. In this way ticket B can only be read after being picked up by the user, thus preventing it from being read by prying eyes. The steps performed during the second operating mode of the printer 1 therefore allow the confidentiality of the information printed on ticket B to be preserved. Furthermore, in the second operating mode, step k) allows ticket B to be retracted after a pre-established time, which, for any reason, for example due to user inattention, has not been withdrawn by the user, and to store ticket B in collection area R. This operating mode can prevent ticket B from being withdrawn in an undesired manner from another user.

The operation of the printer 1 implements a printing method which may comprise, in particular, the step of providing a printer with a printing device (printing head 3 and printing roller 4), a first outlet 2 for a print support P and a second outlet 7 for the print support P. The printer is configured, in particular, for selective mounting in a first configuration, in which the first outlet 2 faces a reception area U in which a user can receive a print support P which comes out from the first outlet 2, and in a second configuration, in which the second outlet 7 faces the reception area U in which a user can receive a print support P which comes out from the second outlet 7.

If the printer is mounted in the first configuration, the method may include, in particular, the steps of:

feeding a print support P to the printing device while the print support P advances towards the first outlet 2;

stopping the advancement of a first end 11 of the print support P before the first end 11 comes out of the first outlet 2 and then continuing to feed the print support P to the printing device so as to form an accumulation loop H of print support P coming out of the second outlet 7;

stopping the feeding of the print support P and (for example, after the aforementioned stop) cutting the print support P to form a ticket B which can then be dispensed through the first outlet 2.

If the printer is mounted in the second configuration, the method may include, in particular, the steps of:

feeding a print support P to the printing device while the print support P advances to the outlet 2;

stopping the feed of the print support P and (for example, after the aforementioned stop) cutting the print support P to form a ticket B which has a first end 11 distant from a cutting device 5 and a second end 12 close to the cutting device 5;

feeding ticket B towards the first outlet 2, stopping the feeding towards the first outlet 2 before the second end 12 of ticket B crosses the first outlet 2, after which feeding ticket B in the opposite direction towards the second outlet 7, stopping the feeding when the second end 12 of ticket B has passed the second outlet 7 and at least a portion of ticket B is exposed to the user, and therefore if ticket B is not withdrawn by the user within a predetermined time, withdrawing ticket B towards the first outlet 2 which faces a collection area R for uncollected tickets.

The invention claimed is:

1. A ticket printer, comprising:

a first support having a first outlet for a print support and a second outlet for the print support, said first support being configured for mounting in a first configuration in which said first outlet faces a reception area external to said first support in which a user receive a ticket that exits from said first outlet;

a printing device arranged in said first support and comprising a printing head and a printing roller cooperating with each other;

a cutting device arranged in said first support and configured to form a ticket with the print support;

a feeding device provided with a reversible rotary motion with the possibility of rotating in a first direction to feed the print support towards said first outlet and to rotate in a second direction, opposite to said first direction, to feed the print support towards said second outlet;

a second support configured to receive said first support both in said first configuration and in a second configuration in which said second outlet faces the reception area in which a user can receive the ticket that exits from said second outlet, said first support being selectively mountable in said first configuration or in said second configuration;

said second support comprising at least one delivery outlet which faces the first outlet when said second support receives said first support in the first configuration and which faces the second outlet when said second support receives said first support in the second configuration;

said second support comprising a housing that includes a delivery side which has said at least one delivery outlet;

said second support comprising at least one collection outlet which faces the first outlet when said second support receives said first support in the second configuration, said housing including a lower base which has said at least one collection outlet; and a control unit configured to perform a first operating mode when said first support is mounted in said first configuration, and a second operating mode when said first support is mounted in said second configuration;

said first operating mode including the following steps:

a) driving the printing roller and rotating the feeding device in the first direction to feed the print support towards the first outlet, b) after step a), stopping the feeding device when the print support has engaged with the feed device and continuing to drive the printing roller, so that a first end of the print support is blocked by the feeding device and the print support is moved by the printing roller forming an accumulation loop that comes out of the second outlet, c) after step b), stopping the printing roller and driving the cutting device to cut the print support and form the ticket, and d) after step c), rotating the feeding device in the first direction to dispense the ticket through said first outlet facing the reception area;

said second operating mode comprising the following steps:

e) driving the printing roller and rotating the feeding device in the first direction to feed the print support towards the first outlet, f) after step e), stopping the printing roller and stopping the feeding device, g) after step f), driving the cutting device to cut the print support and form the ticket which has a first end distant from the cutting device and a second end close to the cutting device, h) after step g), rotating the feeding device in the first direction to feed the ticket towards the first outlet until the second end of the ticket is arranged in a path portion of the print support comprised between the first outlet and the second outlet, i) after step h), rotating the feeding device in the second direction to dispense the ticket towards the second outlet facing the reception area, j) after step i), stopping the feeding device when the second end of the ticket has passed e second outlet to expose at least a portion of the ticket to the user, at least another portion of the ticket being arranged in the path portion of the print support comprised between the first outlet and the second outlet, and k) after step i), rotating the feeding device in the first direction if the ticket is not collected by the user within a predetermined time, to retract the ticket and evacuate the ticket towards the first outlet which faces a collection area for uncollected tickets.

2. The printer according to claim 1, wherein said feeding device extends in length along a path portion of the print support comprised between said second outlet and said first outlet.

3. The printer according to claim 2, wherein said feeding device comprises:

a first feeding roller, a second feeding roller, and a flexible member coupled to said first and second feeding rollers, said second feeding roller being arranged at a distance from said first feeding roller, wherein said distance extends along said path portion of the print support included between said second outlet and said first outlet, said first feeding roller being arranged closer to said first outlet than said second feeding roller and said second feeding roller being arranged closer to said second outlet than said first feeding roller.

4. The printer according to claim 1, wherein said feeding device comprises:

a first feeding roller, a second feeding roller, and a flexible member coupled to said first and second feeding rollers, said second feeding roller being arranged at a distance from said first feeding roller, wherein said distance extends along said path portion of the print support included between said second outlet and said first outlet, said first feeding roller being arranged closer to said first outlet than said second feeding roller and said second feeding roller being arranged closer to said second outlet than said first feeding roller.

5. The printer according to claim 1, wherein said printing device is configured to print on one side of the print support and in said step j) the portion of the ticket exposed to the user has said side hidden from the user's view.

6. The printer according to claim 1, comprising a printing motor and a feeding motor arranged in said first support, said printing motor being configured to drive the printing roller and said feeding motor being configured to drive said feeding device.

7. The printer according to claim 1, wherein said first support comprises at least one inlet for receiving at least one print support, and wherein at least one path portion of the print support included between said second outlet and said first outlet extends along a direction transverse to at least one path portion of the print support included between said inlet and said cutting device.

8. The printer according to claim 1, wherein said first support comprises at least one inlet for receiving at least one print support, and wherein said inlet is arranged on an inlet face of said first support and said first outlet is arranged on a first outlet face of said first support opposite to said inlet face, said second outlet being arranged on a second outlet face adjacent to said inlet face and to said first outlet face.

9. A kiosk for the distribution of tickets, comprising:

a front wall having an external side accessible to a user of the kiosk and an internal side opposite to said external side, said front wall including a ticket exit opening which defines a reception area which is arranged on said external side of the front wall and in which the user can receive a ticket;

a printer arranged on said internal side of the front wall, said printer being made according to claim 1, with the first support selectively mounted in the first configuration or in the second configuration.

10. The kiosk according to claim 9, comprising a collection area inside the kiosk and configured to receive at least one ticket not collected by a user when the printer operates in the second configuration.

11. A printing method comprising the steps of:

providing a ticket printer according to claim 1, with a printing device, a first outlet for a print support and a second outlet for a print support, said printer being configured for selective mounting in a first configuration, in which said first outlet faces a reception area in which a user can receive a print support that comes out of said first outlet, and in a second configuration, in which said second outlet faces the reception area in which a user can receive a print support that comes out of said second outlet;

when said printer is mounted in said first configuration, then:

feeding a print support to said printing device while the print support advances towards said first outlet;

stopping the advancement of a first end of the print support before the exit of said first end from said first outlet continuing to feed the print support to said device printing and forming an accumulation loop of the print support that comes out of said second outlet; and stopping the feeding of the print support and cutting the print support to form a ticket which can then be dispensed through said first outlet;

when said printer is mounted in said second configuration, then:

feeding a print support to said printing device while the print support advances towards said first outlet;

stopping the feeding of the print support and then cutting the print support to form a ticket which has a first end distant from a cutting device and a second end close to the cutting device; and feeding the ticket towards the first outlet and stopping said feeding towards the first outlet, then feeding the ticket in the opposite direction towards the second outlet and stopping said feeding when the second end of the ticket has passed the second outlet and at least a portion of the ticket is exposed to the user, and then, if the ticket is not collected by the user within a predetermined time, retracting the ticket towards the first outlet and ejecting the ticket towards a collection area for uncollected tickets communicating with said first outlet.

* * * * *